US009683501B2

(12) United States Patent
Suzuki et al.

(10) Patent No.: US 9,683,501 B2
(45) Date of Patent: Jun. 20, 2017

(54) INTERNAL COMBUSTION ENGINE CONTROL DEVICE

(71) Applicant: Toyota Jidosha Kabushiki Kaisha, Toyota-shi, Aichi-ken (JP)

(72) Inventors: Takashi Suzuki, Ichinomiya (JP); Tomoya Suzuki, Nagakute (JP); Chisa Watanabe, Okazaki (JP); Tatsuya Fujii, Nagakute (JP); Akihiro Kaneko, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 197 days.

(21) Appl. No.: 14/806,042

(22) Filed: Jul. 22, 2015

(65) Prior Publication Data

US 2016/0025022 A1  Jan. 28, 2016

(30) Foreign Application Priority Data

Jul. 25, 2014  (JP) .................................. 2014-151959

(51) Int. Cl.

| F02D 41/00 | (2006.01) |
| F02M 69/04 | (2006.01) |
| F02D 41/30 | (2006.01) |
| F02D 41/14 | (2006.01) |
| F02M 26/00 | (2016.01) |

(52) U.S. Cl.
CPC ..... F02D 41/0085 (2013.01); F02D 41/0052 (2013.01); F02D 41/1454 (2013.01); F02D 41/1498 (2013.01); F02D 41/3094 (2013.01); F02M 26/00 (2016.02);

(Continued)

(58) Field of Classification Search
CPC ............ F02D 41/0085; F02D 41/1498; F02D 41/3094; F02M 69/046
See application file for complete search history.

(56) References Cited

U.S. PATENT DOCUMENTS

| 2005/0051135 A1* | 3/2005 | Tomoda .............. F02D 41/1498 123/431 |
| 2009/0216429 A1* | 8/2009 | Yamashita .......... F02D 41/0002 701/107 |

(Continued)

FOREIGN PATENT DOCUMENTS

| JP | 2011-157852 A | 8/2011 |
| JP | 2011-226363 A | 11/2011 |
| JP | 2014-031723 A | 2/2014 |

*Primary Examiner* — Hieu T Vo
*Assistant Examiner* — Sherman Manley
(74) *Attorney, Agent, or Firm* — Dinsmore & Shohl LLP

(57) ABSTRACT

A multi-cylinder internal combustion engine includes: a first fuel injection valve that injects fuel into each cylinder; a second fuel injection valve that injects fuel into an intake passage; and an exhaust recirculation device that causes some of exhaust flowing in an exhaust passage to recirculate into the intake passage. A control device is used in the multi-cylinder internal combustion engine. The control device limits recirculation of exhaust into the intake passage by the exhaust recirculation device when imbalance determination is conducted during engine operation by fuel injection from the first fuel injection valve only, compared to when imbalance determination is conducted during engine operation involving fuel injection from the second fuel injection valve.

2 Claims, 3 Drawing Sheets

(52) U.S. Cl.
CPC ..... *F02M 69/046* (2013.01); *F02M 2026/004* (2016.02); *F02M 2026/006* (2016.02); *Y02T 10/47* (2013.01)

(56) References Cited

U.S. PATENT DOCUMENTS

| | | | |
|---|---|---|---|
| 2009/0299610 A1* | 12/2009 | Kumano | F02D 13/0203 701/105 |
| 2012/0209498 A1* | 8/2012 | Aoki | F02D 41/1486 701/103 |
| 2012/0215427 A1* | 8/2012 | Miyamoto | F02D 41/0065 701/108 |
| 2015/0167575 A1* | 6/2015 | Matsumoto | F02D 41/1495 701/102 |

* cited by examiner

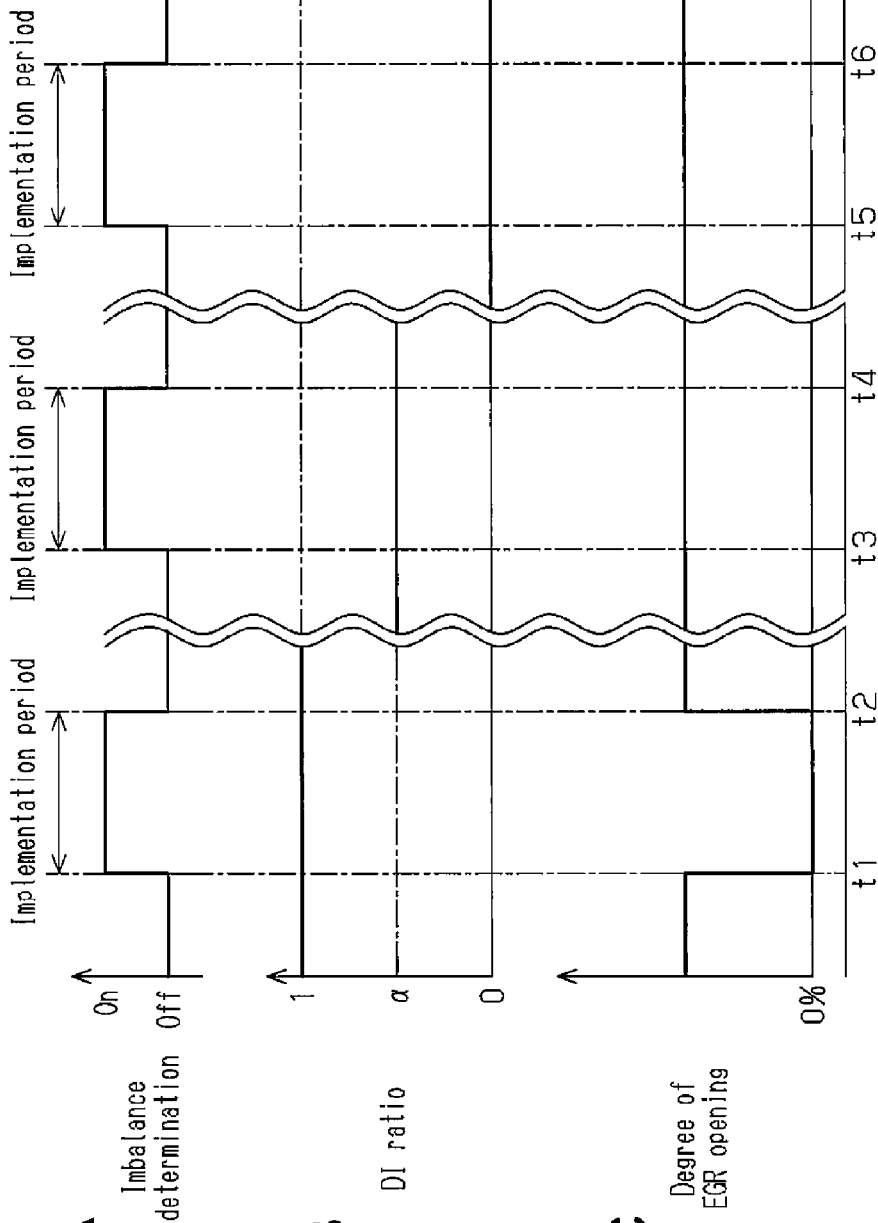

INTERNAL COMBUSTION ENGINE CONTROL DEVICE

BACKGROUND OF THE INVENTION

The present invention relates to an internal combustion engine control device which is applied in a multi-cylinder internal combustion engine.

An internal combustion engine disclosed in Japanese Laid-Open Patent Publication No. 2014-31723 has, in correspondence with each cylinder, a first fuel injection valve that directly injects fuel into the cylinder, and a second fuel injection valve that injects fuel into an intake passage. The internal combustion engine control device disclosed in this document conducts an imbalance determination in order to detect variations in air-fuel ratio among the cylinders.

First, a first imbalance determination is conducted when the engine is operated by injecting fuel from the first fuel injection valve only. A second imbalance determination is conducted when the engine is operated by injecting fuel from both the first and second fuel injection valves after the first imbalance determination. If any variations in air fuel ratio are detected among the cylinders by the second imbalance determination, a third imbalance determination is conducted when the engine is operated by injecting fuel from the second fuel injection valve only. Thus, abnormal states in the first and second fuel injection valves are detected with high accuracy.

An internal combustion engine having an exhaust recirculation device, which recirculates some of exhaust flowing in an exhaust passage into an intake passage, is known. In an internal combustion engine of this type, exhaust is likely to be recirculated into the intake passage during an imbalance determination.

In the internal combustion engine disclosed in Japanese Laid-Open Patent Publication No. 2014-31723, the injection opening of the second fuel injection valve is located inside the intake passage. Therefore, when some of exhaust flows in the intake passage, deposits derived from components contained in the exhaust are likely to stick to and accumulate on the injection opening of the second fuel injection valve, from which fuel is not injected during the first imbalance determination. An accumulation of deposits on the injection opening of the second fuel injection valve narrows the area of the injection opening, which may result in a decrease in quantity of fuel injected from the second fuel injection valve. Therefore, when fuel is injected from the second fuel injection valve, the actual quantity of fuel injected from the second fuel injection valve is likely to be smaller than a target quantity of fuel injected therefrom.

SUMMARY OF THE INVENTION

In order to solve the foregoing problems, according to a first aspect of the present invention, there is provided an internal combustion engine control device which is applied in a multi-cylinder internal combustion engine. The multi-cylinder internal combustion engine includes: a first fuel injection valve that injects fuel into each cylinder; a second fuel injection valve that injects fuel into an intake passage; and an exhaust recirculation device that causes some of exhaust flowing in an exhaust passage to recirculate into the intake passage. The internal combustion engine control device conducts imbalance determination for detecting variations in air-fuel ratio among the cylinders. Additionally, this control device performs a limiting process, thereby limiting recirculation of exhaust into the intake passage by the exhaust recirculation device when imbalance determination is conducted during engine operation by fuel injection from the first fuel injection valve only, compared to when imbalance determination is conducted during engine operation involving fuel injection from the second fuel injection valve.

BRIEF DESCRIPTION OF THE DRAWINGS

FIG. 3A is a timing chart showing transitions in conducting of imbalance determination;

FIG. 3B is a timing chart showing the transitions in DI ratio; and

FIG. 3C is a timing chart showing transitions in degree of EGR opening, which correlates with quantity of exhaust recirculated into an intake passage.

DETAILED DESCRIPTION OF THE PREFERRED EMBODIMENTS

Hereinafter, a preferred embodiment in which an internal combustion engine control device according to the present invention is applied in a multi-cylinder internal combustion engine will be described with reference to FIGS. 1 to 3C.

Figure 1:
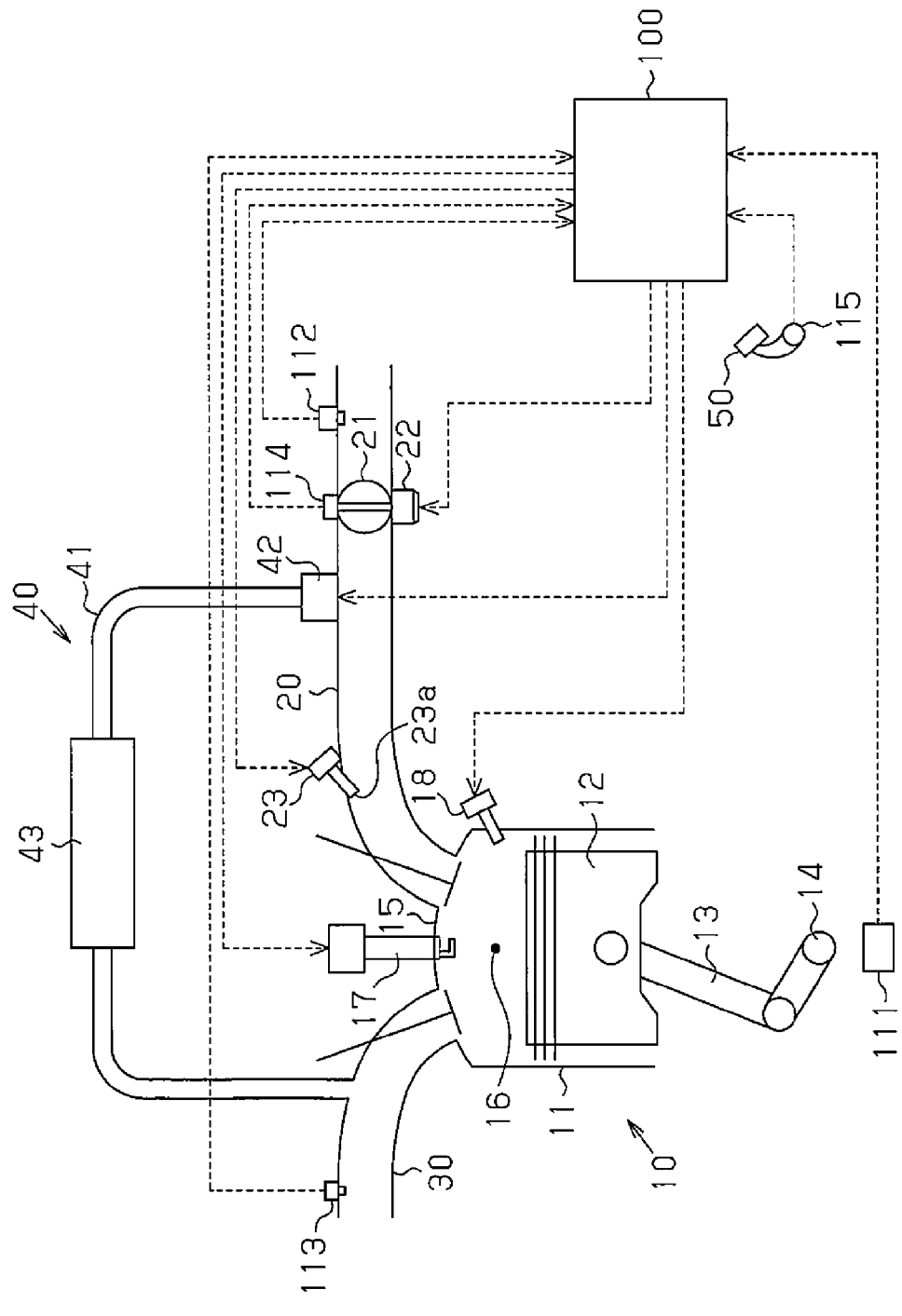
FIG. 1 is a schematic view of a rough configuration of a multi-cylinder internal combustion engine that has an internal combustion engine control device according to one embodiment of the present invention.

FIG. 1 shows a multi-cylinder internal combustion engine 10 having a control device 100, which is the internal combustion engine control device. The internal combustion engine 10 has a plurality of cylinders. FIG. 1 shows only one cylinder.

As shown in FIG. 1, the internal combustion engine 10 includes a cylinder 11 and a piston 12 which is accommodated in the cylinder 11 and reciprocates. Reciprocating motion of the piston 12 is converted to a rotary motion by a connecting rod 13 and then transmitted to a crank shaft 14. The rotating speed of the crank shaft 14 is detected by a crank position sensor 111.

A combustion chamber 16 is defined by the inner periphery of the cylinder 11, the top face of the piston 12, and a cylinder head 15. Attached to the cylinder 11 are an ignition plug 17 and a first fuel injection valve 18. The ignition plug 17 is located on an upper part of the combustion chamber 16 and opposite the piston 12. The first fuel injection valve 18 is located to directly inject fuel into the fuel chamber 16. Connected to the combustion chamber 16 are an intake passage 20 for guiding intake air to the combustion chamber 16, and an exhaust passage 30 into which exhaust expelled from the combustion chamber 16 flows.

Located in the intake passage 20 is a throttle valve 21 for adjusting air taken into the combustion chamber 16. The throttle valve 21 is driven by a motor 22. Located further downstream than the throttle valve 21 in the intake passage 20 is a second fuel injection valve 23 for injecting fuel into the intake passage 20. The injection opening 23a of the second fuel injection valve 23 is located inside the intake passage 20. Located further upstream than the throttle valve 21 in the intake passage 20 is an air flow meter 112 for detecting the quantity of intake air.

In the exhaust passage 30 is an air-fuel ratio sensor 113. The air-fuel ratio sensor 113 detects the oxygen concentration of exhaust flowing in the exhaust passage 30. The air-fuel ratio of a gas mixture burned in the combustion chamber 16 is estimated on the basis of the oxygen concentration of exhaust detected by the air-fuel ratio sensor 113.

Attached to the internal combustion engine 10 is an exhaust recirculation device 40 for causing some of exhaust flowing in the exhaust passage 30 to recirculate in the intake passage 20. The exhaust recirculation device 40 has a recirculation passage 41. One end of the recirculation passage 41 is connected to the exhaust passage 30, and the other end thereof is connected to the intake passage 20. The recirculation passage 41 is connected to a part of the intake passage 20 which is further upstream than the second fuel injection valve 23. Attached to a portion connecting the recirculation passage 41 and intake passage 20 is an adjustment valve 42 for adjusting the quantity of exhaust recirculated into the intake passage 20. In the recirculation passage 41 and between the adjustment valve 42 and exhaust passage 30 is a cooling device 43. The cooling device 43 cools high-temperature exhaust flowing in the recirculation passage 41.

A throttle opening degree sensor 114, accelerator opening degree sensor 115, and so on are electrically connected to the control device 100 in addition to the crank position sensor 111, air flow meter 112, and air-fuel ratio sensor 113. The throttle opening degree sensor 114 detects degree of opening of the throttle valve 21. The accelerator opening degree sensor 115 detects degree of opening of an accelerator, which is the degree of operation of an accelerator pedal 50 operated by a driver of a vehicle. The control device 100 exerts various controls, such as fuel injection control, on the basis of information detected by these sensors.

The control device 100 determines a DI ratio according to the operating state of the internal combustion engine 10. The DI ratio is the ratio of quantity of fuel injected from the fuel injection valve 18 with respect to total quantity of fuel injected, which is the sum of the quantity of fuel injected from the first fuel injection valve 18 and the quantity of fuel injected from the second fuel injection valve 23. If the DI ratio is "1," the control device 100 exerts control such that fuel is not injected from the second fuel injection valve 23 but is injected from the first fuel injection valve 18 only. If the DI ratio is "0," the control device 100 exerts control such that fuel is not injected from the first fuel injection valve 18 but is injected from the second fuel injection valve 23 only. If the DI ratio is "α0 (α is a value larger than 0 but smaller than 1)," the control device 100 exerts control such that fuel is injected from both the first and second fuel injection valves 18, 23.

In order to detect variations in air-fuel ratio among the cylinders, the control device 100 conducts imbalance determination. The imbalance determination is conducted for each fuel injection mode. Specifically, when the DI ratio is "1," that is, when the engine is operated by fuel injection from the first fuel injection valve 18 only, the control device 100 conducts an imbalance determination. Additionally, when the DI ratio is "α," that is, when the engine is operated by fuel injection from both the first and second fuel injection valves 18, 23, the control device 100 conducts an imbalance determination. Furthermore, also when the DI ratio is "0," that is, when the engine is operated by fuel injection from the second fuel injection valve 23 only, the control device 100 conducts an imbalance determination. Engine operation when the DI ratio is smaller than "1" corresponds to "engine operation that involves fuel injection from the second fuel injection valve 23."

One factor in variations of air-fuel ratio among cylinders is variation in quantity of fuel injected among the cylinders. For example, it is assumed that, if one of a plurality of cylinders is defined as a specific cylinder, the quantity of fuel injected into the specific cylinder is larger than the respective quantities of fuel injected into cylinders other than the specific cylinder. In this case, the rotating speed of the crank shaft 14 in the process of combustion in the specific cylinder is higher than that in the process of combustion in each of the other cylinders. As a result, the rotating speed of the crank shaft 14 in one cycle of the internal combustion engine 10 changes.

In view of the foregoing, imbalance determination is conducted by observing variations in the rotating speed of the crank shaft 14 in one cycle of the internal combustion engine 10. If the difference between the maximum and minimum values of the rotating speed in one cycle is not less than a predetermined threshold, it is determined that a variation in air-fuel ratio among the cylinders may have occurred. Conversely, if the variation is less than the threshold, it is determined that there is no variation in air-fuel ratio among the cylinders. These determinations are conducted in a fixed period set in advance. For example, if cycles having the foregoing difference not less than the threshold successively occur within the fixed period, a determination is made that a variation in air-fuel ratio among the cylinders has occurred.

The technique for detecting degree of variation in air-fuel ratio among cylinders is known. For example, in addition to the method for observing variation in rotating speed of the crank shaft 14, a method for observing variation in oxygen concentration detected by the air-fuel ratio sensor 113, that is, variation in air-fuel ratio calculated on the basis of the oxygen concentration is also known.

In a case where imbalance determination is conducted while exhaust is recirculated into the intake passage 20 by the exhaust recirculation device 40 and the DI ratio is "1," fuel has not been injected from the second fuel injection valve 23. In this case, since the injection opening 23a of the second fuel injection valve 23 is located in the intake passage 20, deposits derived from components contained in exhaust are likely to stick to the injection opening 23a of the second fuel injection valve 23. Taking this into account, the present embodiment performs a limiting process. Thereby, when imbalance determination is conducted during engine operation by fuel injection from the first fuel injection valve 18, recirculation of exhaust into the intake passage 20 by the exhaust recirculation device 40 is limited, compared to when imbalance determination is conducted during engine operation involving fuel injection from the second fuel injection valve 23. Specifically, when imbalance determination is conducted during engine operation by fuel injection from the first fuel injection valve 18, recirculation of exhaust into the intake passage 20 by the exhaust recirculation device 40 is inhibited.

Conversely, in a case where imbalance determination is conducted when the DI ratio is not "1," fuel has been injected from the second fuel injection valve 23. Therefore, even when exhaust is recirculated into the intake passage 20, deposits derived from components contained in exhaust are less likely to stick to the injection opening 23a of the second fuel injection valve 23. Therefore, when imbalance determination is conducted during engine operation involving fuel injection from the second fuel injection valve 23, the limiting process described above is not performed. Accordingly, in this case, exhaust is recirculated into the intake passage 20 by the exhaust recirculation device 40.

Next, a procedure in processing performed by the control device 100 when conditions for conducting imbalance determination are established will be described with reference to a flowchart shown in FIG. 2.

Figure 2:
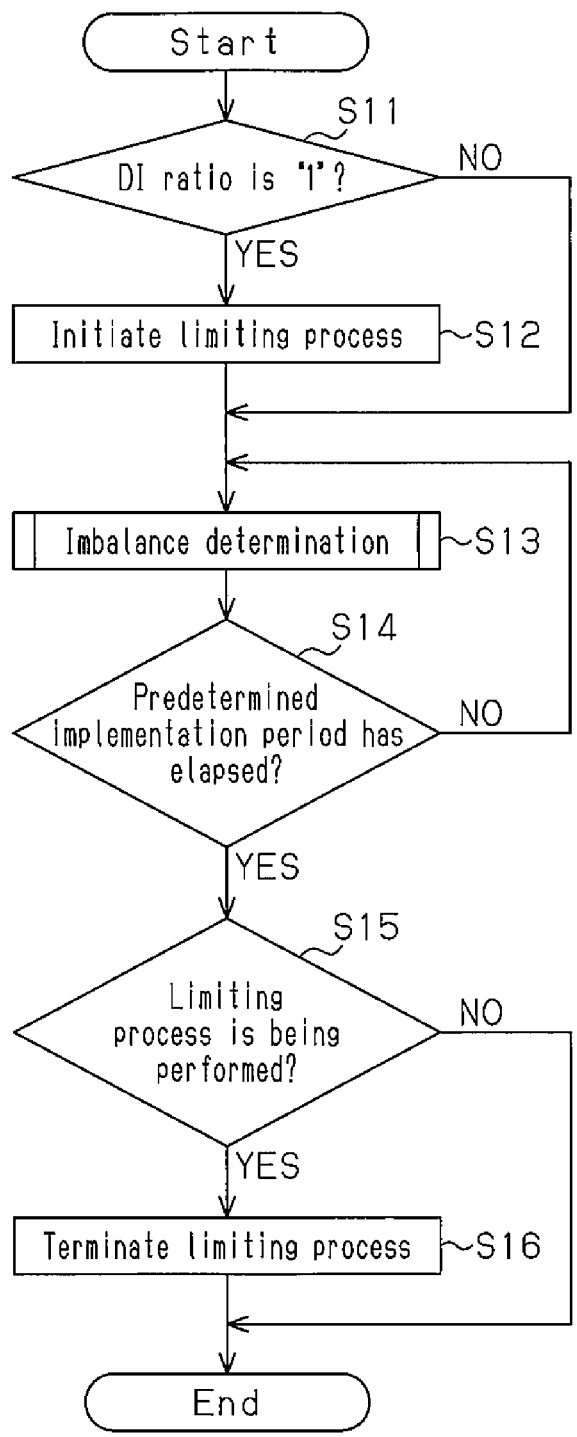
FIG. 2 is a flowchart illustrating a procedure in processing performed when conditions for conducting imbalance determination are established.

As shown FIG. 2, the control device 100 first determines whether the DI ratio is presently "1" or not (step S11). Specifically, in step S11, the control device 100 determines whether or not present engine operation is engine operation by fuel injection from the first fuel injection valve 18 only, which is used for injection into cylinders. If the DI ratio is "1" (step S11: YES), the control device 100 initiates the limiting process (step S12). In this case, the control device 100 closes the adjustment valve 42 of the exhaust recirculation device 40, and inhibits recirculation of exhaust into the intake passage 20. Thereafter, the control device 100 proceeds to the next processing step S13.

Conversely, if the DI ratio is not "1" (step S11: NO), the control device 100 proceeds to the next processing step S13, without performing the limiting process (step S12).

In S13, the control device 100 conducts imbalance determination. Then, in step S14, the control device 100 determines whether or not a lapse of time from the start of the imbalance determination has reached a predetermined implementation period. This implementation period is the time required for imbalance determination. If the lapse of time from the start of the imbalance has not reached the implementation period (step S14: NO), the control device 100 continues imbalance determination (step S13). Conversely, if the lapse of time from the start of imbalance determination has reached the implementation period (step S14: YES), the control device 100 ends imbalance determination. Then, the control device 100 determines whether the limiting process is being performed or not (step S15). If the limiting process is being performed (step S15: YES), the control device 100 terminates the limiting process (step S16) and, thereafter, ends this processing. Conversely, if the limiting process is not being performed (step S15: NO), the control device 100 ends this processing without carrying out step S16.

Next, an operation during imbalance determination will be described with reference to a timing chart shown in FIG. 3.

As shown in FIGS. 3A to 3C, when conditions for conducting imbalance determination are established at the first timing t1, in which a DI ratio is "1," and hence imbalance determination is conducted, the degree of EGR opening, which is the degree of opening of the adjustment valve 42 of the exhaust recirculation device 40, is "0%" and recirculation of exhaust into the intake passage 20 is inhibited. That is, the quantity of exhaust taken into the intake passage 20 decreases compared to that obtained immediately before the start of imbalance determination. Consequently, during engine operation by fuel injection from the first fuel injection valve 18 only, imbalance determination is conducted while recirculation of exhaust into the intake passage 20 is inhibited. When imbalance determination ends at the second timing t2 thereafter, the limiting process described above also terminates. That is, the inhibition of recirculation of exhaust into the intake passage 20 is cancelled, and exhaust is recirculated into the intake passage 20. For example, at the second timing t2, the degree of EGR opening is returned to the degree obtained immediately before the start of imbalance determination. If the inhibition of recirculation of exhaust into the intake passage 20 is cancelled at this time, the degree of EGR opening does not have to be returned to the degree of opening obtained immediately before the start of imbalance determination.

Conversely, when the conditions for conducting imbalance determination are established at the third timing t3, in which the DI ratio is "α (0<α<1)," and hence imbalance determination is conducted, recirculation of exhaust into the intake passage 20 is not limited, unlike the case where the DI ratio is "1." Specifically, during engine operation by fuel injection from both the first and second fuel injections 18, 23, imbalance determination is conducted while exhaust is recirculated into the intake passage 20. Such imbalance determination is ended at the fourth timing t4 thereafter.

Similarly, when the conditions for conducting imbalance determination are established at the fifth timing t5, in which the DI ratio is "0," and hence imbalance determination is conducted, recirculation of exhaust into the intake passage 20 is not limited. That is, even during engine operation by fuel injection from the second fuel injection valve 23 only, imbalance determination is conducted while exhaust is recirculated in the intake passage 20. Such imbalance determination is ended at the sixth timing t6 thereafter.

According to the foregoing embodiment, the advantageous effects described below can be obtained.

(1) When imbalance determination is conducted during engine operation by fuel injection from the first fuel injection valve 18 only, the limiting process is performed, unlike the case where the imbalance determination is conducted during engine operation involving fuel injection from the second fuel injection valve 23. As a result, even in the case where imbalance determination is conducted during engine operation by fuel injection from the first fuel injection valve 18 only, deposits derived from components contained in exhaust are less likely to stick to the injection opening 23a of the second fuel injection valve 23. By virtue of this, sticking of deposits to the injection opening 23a, which results in a decrease in the opening area of the injection opening 23a, is prevented. Accordingly, insufficiency in quantity of fuel injected from the second fuel injection valve 23, that is, divergence between a target quantity of fuel injected and an actual quantity of fuel injected is less likely occur. Therefore, imbalance determination can be conducted while sticking of deposits to the second fuel injection valve 23 is prevented.

(2) In the present embodiment, the limiting process makes exhaust less likely to be circulated in the intake passage 20. Therefore, even when imbalance determination is conducted during engine operation by fuel injection from the first fuel injection valve 18 only, deposits derived from components contained in exhaust are prevented from sticking to the injection opening 23a of the second fuel injection valve 23.

(3) Conversely, when imbalance determination is conducted during engine operation involving fuel injection from the second fuel injection valve 23, the limiting process is not performed, so that exhaust is recirculated into the intake passage 20. Therefore, compared to the case where the limiting process is performed when imbalance determination is conducted during engine operation involving fuel injection from the second fuel injection valve 23, the period for which recirculation of exhaust into the intake passage 20 is limited is short, thus improving fuel consumption efficiency of the internal combustion engine 10.

The foregoing embodiment can be modified as described below.

In the limiting process, if a degree of EGR opening, which correlates with a quantity of exhaust recirculated into the intake passage 20, can be made less than that during imbalance determination when the DI ratio is not "1," the degree of EGR opening may have a value greater than "0%." In this case also, by the limiting process performed during imbalance determination when the DI ratio is "1," the quantity of exhaust recirculated into the intake passage 20 can be reduced compared to a case where imbalance determination is conducted when the DI ratio is not "1." As a result, deposits derived from components contained in exhaust can be prevented from sticking to the injection opening 23a of the second fuel injection valve 23.

If the conditions for conducting imbalance determination are established when the DI ratio is "1," imbalance determination may be started after a prescribed time has elapsed since the recirculation of exhaust into the intake passage 20 has been inhibited by the limiting process. Starting imbalance determination later than the limiting process in this way makes it possible to further improve the effect of preventing exhaust-derived deposits from sticking to the injection opening 23a of the second injection valve 23.

Even in a case where imbalance determination is conducted when the DI ratio is not "1," the degree of EGR opening may be smaller than that obtained immediately before the start of imbalance determination. In this case, it is preferable that the limiting value for the degree of EGR opening when the DI ratio is not "1" is larger than that when the DI ratio is "1." Thereby, the quantity of exhaust taken into the intake passage 20 in a case where imbalance determination is conducted when the DI ratio is "1," can be made smaller than that in a case where imbalance determination is conducted when the DI ratio is not "1."

As a method for recirculating exhaust into the combustion chamber 16 in each cylinder 11, in addition to a method for recirculating exhaust into the intake passage 20 via the exhaust recirculation device 40, the following method is also known: for example, the timing of the opening of an exhaust valve is adjusted so that the exhaust valve is open also during a process of taking in air, thereby causing exhaust in the exhaust passage 30 to reverse-flow into the combustion chamber 16. In this method, some of exhaust caused to reverse-flow into the combustion chamber 16 from the exhaust passage 30 is likely to flow into the intake passage 20. Therefore, when using the foregoing method, it is preferable to conduct the limiting process, described above, by adjusting the timing of the opening of the exhaust valve, thereby decreasing the quantity of exhaust reverse-flowing into the combustion chamber 16 from inside the exhaust passage 30 during the process of taking in air, or thereby keeping the exhaust valve open during the process of taking in air.

What is claimed is:

1. An internal combustion engine control device which is applied in a multi-cylinder internal combustion engine,
    the multi-cylinder internal combustion engine including:
        a first fuel injection valve that injects fuel into cylinders,
        a second fuel injection valve that injects fuel into an intake passage, and
        an exhaust recirculation device that recirculates some of exhaust flowing in an exhaust passage into the intake passage,
    wherein the internal combustion engine control device conducts imbalance determination for detecting variations in air-fuel ratio among cylinders, and
    wherein the internal combustion engine control device performs a limiting process, thereby limiting recirculation of exhaust into the intake passage by the exhaust recirculation device when conducting the imbalance determination during engine operation by fuel injection from the first fuel injection valve only, compared to when conducting the imbalance determination during engine operation involving fuel injection from the second fuel injection valve.

2. The internal combustion engine control device according to claim 1, wherein recirculation of exhaust into the intake passage by the exhaust recirculation device is inhibited by the limiting process.

* * * * *